UNITED STATES PATENT OFFICE.

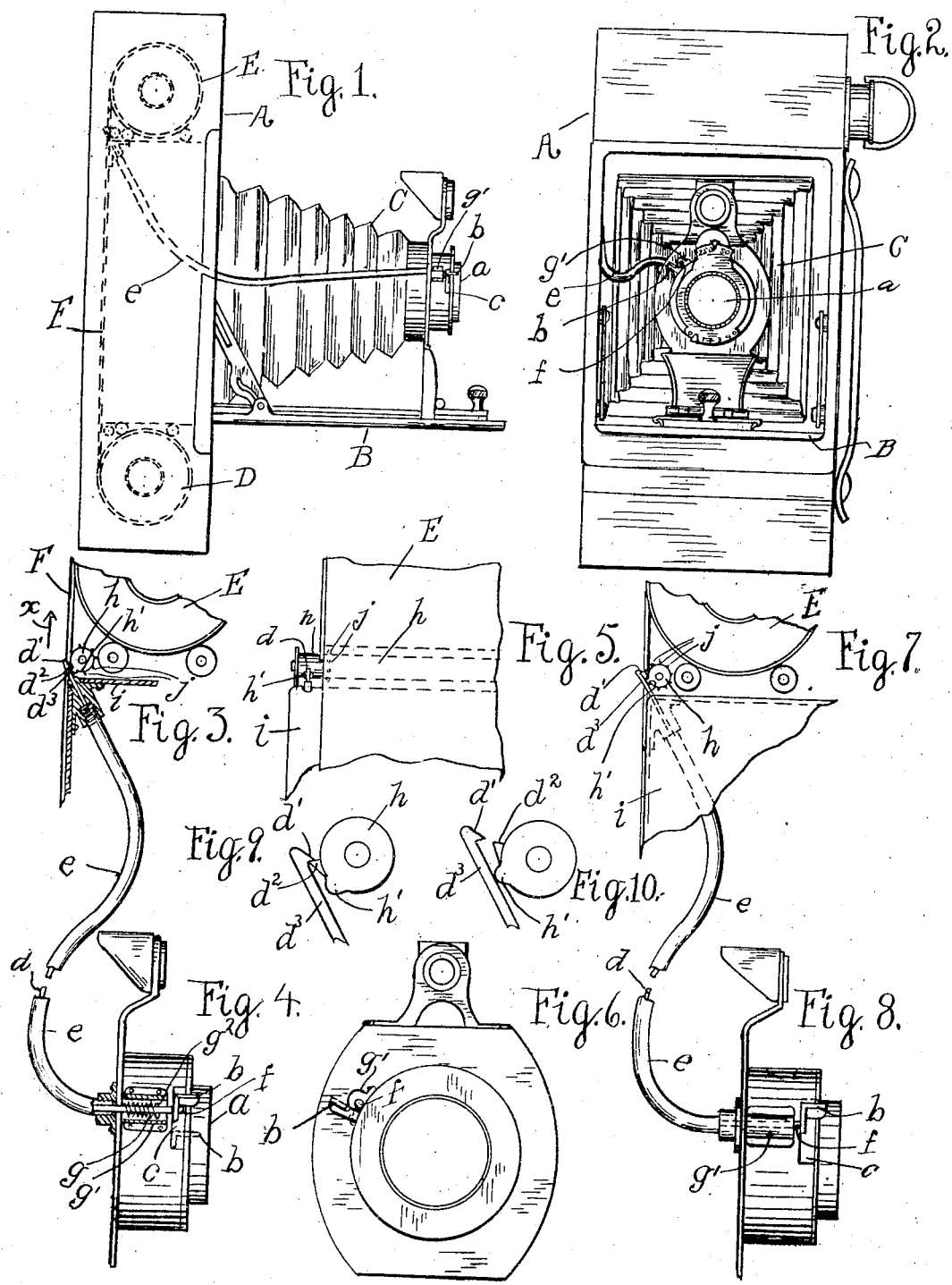

OSCAR HOWARD WILBER, JR., OF NEW BOSTON, MASSACHUSETTS.

DEVICE TO PREVENT DOUBLE EXPOSURE IN CAMERAS.

1,253,321.   Specification of Letters Patent.   Patented Jan. 15, 1918.

Application filed November 27, 1916.   Serial No. 133,540.

*To all whom it may concern:*

Be it known that OSCAR HOWARD WILBER, Jr., a citizen of the United States, whose residence and post-office address is New Boston, county of Berkshire, and State of Massachusetts, have invented certain new and useful Improvements in Devices to Prevent Double Exposure in Cameras, fully described and represented in the following specification and the accompanying drawings, forming a part of the same.

This invention relates to an attachment that may be applied to any camera to prevent double exposure, that is the superposition of two pictures on a single film.

This object is attained by providing a stop which locks and unlocks the trigger of the shutter automatically after an exposure has been made with means for actuating the stop in connection with the mechanism for moving the film or sensitized medium when a fresh portion of such medium is moved into position for a new exposure.

A special advantage of my invention lies in the fact that it may be included in the construction of any camera with but little additional expense or may be installed very cheaply upon any camera now in use.

In the accompanying drawings, I have illustrated my device as applied to a strip or roll film camera.

The invention will be understood by reference to the annexed drawing, in which Figure 1 is a side elevation of a folding camera having my device applied thereto; Fig. 2 is a front elevation of the camera; Fig. 3 shows one portion of my device on a large scale partly in section; Fig. 4 shows another portion on a large scale partly in section; Fig. 5 is a rear view of the parts shown in Fig. 3; Fig. 6 is a front view of the parts shown in Fig. 4; Fig. 7 is a view similar to Fig. 3, but showing the working parts in a different position. Fig. 8 is a view similar to Fig. 4, with the working parts in a different position. Fig. 9 is an enlarged portion of the mechanism. Fig. 10 is a similar view but with working parts in different positions.

In the construction shown herein, A is the camera body, B is the hinged door, which when opened as shown in Figs. 1 and 2, provides a platform to support the bellows C and lens $a$; said lens being exposed by the customary shutter which is actuated in the usual manner by a trigger $b$ moving in a slot $c$.

It is well known that when the trigger is pressed down to operate the shutter, the shutter will not operate again until the trigger has been returned to its normal or upper position. I utilize this fact by providing a flexible rod $d$, inclosed in a covering $e$ to guide its movement, arranged in such manner that one end $f$ of the rod may be moved in the path of the trigger after the trigger is pressed downwardly to make an exposure.

A spring $g$ operating against a pin $g^2$ on the rod and housed in a casing $g'$ presses the end $f$ of the cable normally against the side of the trigger when the said trigger is in a position at the upper end of the slot $c$ (see Fig. 8) in readiness to operate the shutter. Thus it will be seen that when the trigger is pressed downwardly and an exposure made, the trigger ceases to obstruct the movement of the end $f$, and said end $f$ of the rod being operated by the spring moves into the path of the trigger, and prevents the movement of said trigger to the opposite or upper end of the slot (see Figs. 4 and 6). Consequently no operation of the shutter is possible until the end $f$ is withdrawn. The possibility of reëxposing the film is therefore eliminated.

At the end $d^3$ of the rod, (opposite to the end $f$), I provide a hook $d'$ to engage with a lug $d^2$ provided at one end of a roller $h$ beyond the edge of the film, such roller being carried on camera frame $i$. The same roller may be used that is commonly provided in cameras to facilitate the movement of the film. The film F passes from the unexposed roll D over the roller $h$ to the receiving roll E and thereby rotates the roller $h$, teeth $j$ being located in a suitable position thereon to make such rotation positive; such teeth being located to bite along the border of the film, but in no way injure that portion which becomes the negative.

It will therefore be seen that when the shutter is locked as shown in Fig. 4, the hook $d'$ will be engaged with the lug $d^2$, as the spring $g$ keeps them normally in such relation. When the receiving roll E is turned in the usual manner to draw a new portion of the film into position for another exposure, the film moves in the direction of the arrow X, and rotates the roll $h$, thereby drawing the rod from the path of the trigger, the removal of said rod permitting the trigger to return to its normal position as shown in Fig. 8. As the roller $h$ is rotated, the rod is moved and as soon as the end $f$ clears the trigger, the trigger returns to its normal position (and into the path of the rod end $d$), and a continued rotation of the roller $h$ moves an adjacent cam-face $h'$ on the roll against the end $d^3$ and disengages the hook $d'$ from the lug $d^2$ (see Figs. 7, 9 and 10). The film may then be turned for a new exposure, as the hook $d'$ will be out of the path of the lug $d^2$ until the trigger $b$ is removed from the path of the rod end $d$. This operation is repeated automatically at each actuation of the trigger, and provides a positive automatic lock which is simple in construction and effective in its operation. Since the rod used to control the action of the trigger is flexible, it will readily be seen that the device is entirely operative if the camera is closed and the bellows is folded as the flexible rod will coil or double up and may lie in any position and perform the work for which it is intended. The advantage of this invention will be readily appreciated when it is understood that a positive prevention of double exposure is accomplished without complicated and costly mechanism.

Now having described my improvements, I claim as my invention.

1. A camera arranged to contain a movable film for a plurality of exposures, a shutter having a trigger, a roller contiguous to the said film and arranged to be revolved by the movement of the film, a flexible rod having one end held normally against the side of the trigger, means for moving the said end of the rod in the path of the trigger when the trigger is moved and connection between the opposite end of the said rod and roller whereby the rod is moved from the path of the trigger as the film is moved.

2. A camera arranged to contain a movable film for a plurality of exposures, a shutter having a trigger, a roller provided with a lug and having a portion of its face contiguous to the said film and thereby being revolved when the film is moved, a flexible rod having one end held normally against the trigger, a spring for moving the rod in the return path of the trigger when the trigger is moved in one direction and a hook upon the opposite end of the rod to engage with the lug upon the roller operating to withdraw the opposite end of the rod from the path of the trigger permitting the same to return to its normal position when the film is moved for a new exposure.

3. A camera arranged to contain a movable film for a plurality of exposures, a shutter having a trigger normally held at the upper end of a slot, a roller provided with a lug and an adjacent cam-face operated by the movement of the film, a flexible rod held normally against the side of the trigger when the same is at the upper end of the slot, means for moving the end of the rod across the slot to prevent the return of the trigger after the same has been moved downwardly, a hook upon the opposite end of the rod to engage with the lug operating to withdraw the opposite end of the rod from the path of the trigger permitting the same to return to its normal position at the upper end of the slot when the film is moved for a new exposure and the cam-face operating to disengage the hook from the lug upon the roller.

In testimony whereof I have hereunto set my hand.

OSCAR HOWARD WILBER, Jr.